United States Patent
Knauer

(10) Patent No.: US 7,717,208 B2
(45) Date of Patent: May 18, 2010

(54) CLOSEABLE MOTOR VEHICLE RADIATOR GRILL ARRANGEMENT

(75) Inventor: Bernd Knauer, Esslingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 261 days.

(21) Appl. No.: 11/576,167

(22) PCT Filed: Sep. 27, 2005

(86) PCT No.: PCT/EP2005/010425

§ 371 (c)(1),
(2), (4) Date: Mar. 28, 2007

(87) PCT Pub. No.: WO2006/034841

PCT Pub. Date: Apr. 6, 2006

(65) Prior Publication Data

US 2008/0073920 A1    Mar. 27, 2008

(30) Foreign Application Priority Data

Sep. 29, 2004    (DE) ..................... 10 2004 048 038

(51) Int. Cl.
*B60K 11/00* (2006.01)
(52) U.S. Cl. ..................... 180/68.6; 180/68.1
(58) Field of Classification Search ............... 180/68.1, 180/54.1, 68.6, 89.1; 293/115; 165/44
See application file for complete search history.

(56) References Cited

U.S. PATENT DOCUMENTS

| 1,950,792 | A | * | 3/1934 | Green | 165/98 |
|---|---|---|---|---|---|
| 1,973,078 | A | * | 9/1934 | Jackson et al. | 165/98 |
| 2,205,661 | A | | 6/1940 | Kraft | |
| 4,345,510 | A | * | 8/1982 | Sterett | 454/315 |
| 4,410,032 | A | * | 10/1983 | Mori | 165/44 |
| 4,916,902 | A | * | 4/1990 | Pratt et al. | 60/599 |
| 5,046,406 | A | * | 9/1991 | Harris et al. | 454/313 |
| 5,327,989 | A | | 7/1994 | Furuhashi et al. | |
| D420,633 | S | * | 2/2000 | Daniels et al. | D12/163 |
| 6,041,878 | A | * | 3/2000 | Daniels et al. | 180/68.6 |

FOREIGN PATENT DOCUMENTS

| DE | 101 37 175 A1 | 2/2003 |
|---|---|---|
| EP | 0 179 304 A | 4/1986 |
| EP | 0 327 740 A | 8/1989 |
| GB | 266 274 A | 2/1927 |

* cited by examiner

*Primary Examiner*—Paul N Dickson
*Assistant Examiner*—Vaughn T Coolman
(74) *Attorney, Agent, or Firm*—Hossle Kudlek & Partner

(57) ABSTRACT

A closeable motor vehicle radiator grill arrangement (1), comprising a radiator grill (2) which comprises at least one through-flow opening (3) for air in the direction of the approach flow (A) and which is provided on the outer side of the radiator grill arrangement. The inventive device also comprises a single pieced connection element structure (5) which is provided on the inner side of the radiator grill arrangement (1) adjacent to the radiator grill (2). The connection element structure can be moved in relation to the radiator grill in order to close the air through-flow opening (3).

11 Claims, 3 Drawing Sheets

CLOSEABLE MOTOR VEHICLE RADIATOR GRILL ARRANGEMENT

The invention relates to a closeable motor vehicle radiator grill arrangement.

Closeable motor vehicle radiator grill arrangements are known in the art. Inlets for cooling air in a radiator grill can be closed off, for example, by means of fins or the like provided behind the radiator grill and this may take place depending on the travel status of the vehicle. The closing of the cooling air inlets of the radiator grill may lead to an improvement in the $c_w$ value and additionally adapt the quantity of incoming cooling air better to the travel status of the vehicle.

A closeable radiator grill for motor vehicles is known from DE 200 21 023 U1. Behind the immovable radiator grill are provided louver slats which can be bent at right-angles (i.e. transversely) to the direction of inflow in order to close off interstices, i.e. cool air inlets, in the radiator grill. The mounting of the louver slats and their construction with hard zones and soft zones provided between them is, however, laborious and expensive.

DE 39 16 907 A1 discloses a control means for movable parts of a radiator grill. The radiator grill comprises movable parts in the form of slats which can be pivoted transversely to the direction of inflow and which can be moved, as a function of the travel status of the vehicle, from an open state into a locked position in which they extend substantially perpendicularly. In this radiator grill, too, closeability is provided by means of individual adjustable slats. However, the mounting of the slats and their operation is laborious and hence prone to breakdown as well as being expensive.

U.S. Pat. No. 1,950,792 discloses a radiator grill arrangement for a motor vehicle which consists of a fixed grid and a movable grid, having identically shaped strips, respectively. Using a mechanism the movable grid can be moved towards the fixed grid so that the strips of the movable grid close off the gaps between the strips of the fixed grid. The radiator grill arrangement consisting of a number of individual parts is consequently prone to breakdown, however, and not suitable for elastic deformation which allows adaptation to one or more curved radiator grill arrangements.

DE 31 51 435 A1 discloses a radiator grill for motor vehicles with a fixed grid comprising a plurality of slats and attached to the bodywork and a movable second grid which also comprises a plurality of slats. The movable grid can be moved such that its slats form together with the slats of the fixed grid a sealed, aerodynamically and optically satisfactory surface. However, the radiator grill is not suitable for elastic adaptation to one or more curved radiator grill arrangements.

Accordingly, it is an object of the invention to provide a closeable motor vehicle radiator grill arrangement by the simplest possible means.

The invention is solved by a radiator grill arrangement having the features of claim 1. Advantageous further features of the invention are recited in the dependent claims 2 to 11.

A closeable motor vehicle radiator grill arrangement according to the invention comprises a radiator grill which has at least one air flow opening in the inflow direction and is provided on an outer side of the radiator grill arrangement, and a one-piece strip element assembly which is provided on an inner side of the radiator grill arrangement adjacent to the radiator grill, the strip element assembly being movable relative to the radiator grill in order to close off the air flow opening.

In the radiator grill arrangement according to the invention the radiator grill may expediently be constructed as a conventional radiator mask which is substantially rigid and not readily deformable. The essential advantage of the invention is that the one-piece strip element assembly is matched in its geometry to the air flow opening of the radiator grill so that the air flow opening can be closed by a movement of the strip element assembly relative to the radiator grill.

The strip element assembly as a movable part is characterised primarily by its simple geometry with a minimum number of parts. There is therefore no need for complex and complicated mountings for a plurality of moving parts in the radiator grill arrangement according to the invention. Because only one part is moved, i.e. the strip element assembly, relative to the radiator grill, the radiator grill arrangement is hardly prone to breakdown if at all and can moreover be produced cheaply and with no great effort.

According to an advantageous further feature of the invention the strip element assembly, with a suitable width of air flow openings in the radiator grill, can be moved, particularly translatory transversely to the inflow direction. This type of movement of the strip element assembly can very easily be achieved by means of a suitable actuator device connected to the strip element assembly.

In an alternative embodiment of the invention the strip element assembly can also be moved in the direction of inflow. The strip element assembly can either be moved back and forth as a whole relative to the radiator grill in order to close off the air flow opening. However, the strip element assembly may also be elastically deformed over its height and/or width so that a change in the spacing of opposing edge regions of the strip element assembly causes movement or displacement of a central region of the strip element assembly relative to the radiator grill. Starting from an initial position of the radiator grill arrangement in which the air flow opening is open, by moving an edge region of the strip element assembly in the direction of an opposing edge region, a central part, for example, of the strip element assembly can be moved in the direction of the radiator grill, so as to close off the air flow opening in this way.

According to an advantageous further feature of the invention the radiator grill may comprise a plurality of air flow openings. Accordingly, the strip element assembly comprises a plurality of individual strips which are adapted to the air flow openings in order to close off the air flow openings when there is a corresponding movement of the strip element assembly in the direction of the radiator grill.

The strip element assembly may expediently be made of a plastic. By injection moulding or similarly processing a plastic, complex grid structures can be produced in a very short time without the need for further machining. Any mounting devices needed in the form of pins or the like can readily be formed during injection moulding in the single manufacturing step.

According to an advantageous further feature of the invention the strip element assembly may be made of a composite structure consisting of plastics and metal. The composite of plastics and metal allows desired deformation of the strip element assembly in order to close off the air flow openings in the radiator grill but is still more inherently rigid than pure plastics. This ensures that even when the vehicle is travelling at high speeds and subjected to correspondingly strong wind forces acting on the strip element assembly, the strip element assembly cannot flap or even lift away from the radiator grill in the closed state of the radiator grill arrangement.

According to an advantageous further feature of the invention the air flow opening through the strip element assembly can be closed off depending on the travel status of the vehicle. For example, the air flow opening is closed off by the strip element assembly when the vehicle is travelling at high speed, and this has a favourable effect on the air resistance coefficient ($c_w$ value) of the vehicle. Moreover, the airflow opening can be closed off by the strip element assembly when the vehicle is stationary. This has an advantageous effect on the appearance of the radiator grill arrangement from the outside, as any engine components arranged behind the radiator grill arrangement cannot be viewed through the radiator grill.

Whereas in the embodiment described above the travel status is the variable on the basis of which the closure status of the air flow openings is regulated, other parameters may also be used, of course.

For example, the closed status of the air flow openings can also be regulated on the basis of engine temperature. Such a regulation can ensure a suitable closed state even when the vehicle is stationary. When the vehicle is started up the air flow openings can be closed in order to allow the engine to heat up to the desired operating temperature as quickly as possible. After the engine has been switched off the air flow openings may remain open for a certain length of time to enable the heated engine to cool in the stationary vehicle. Naturally it is also possible to base the regulation on a combination of different variables, such as the travel status of the vehicle and the engine temperature.

Further features and advantages of the invention will become apparent from the specification and the attached claims.

It will be understood that the features mentioned above and those to be described hereinafter may be used not only in the combination specified but in other combinations or on their own without departing from the scope of the present invention.

The invention is diagrammatically illustrated in the drawings by means of an embodiment by way of example and is described in detail hereinafter with reference to the drawings.

Figure 1:
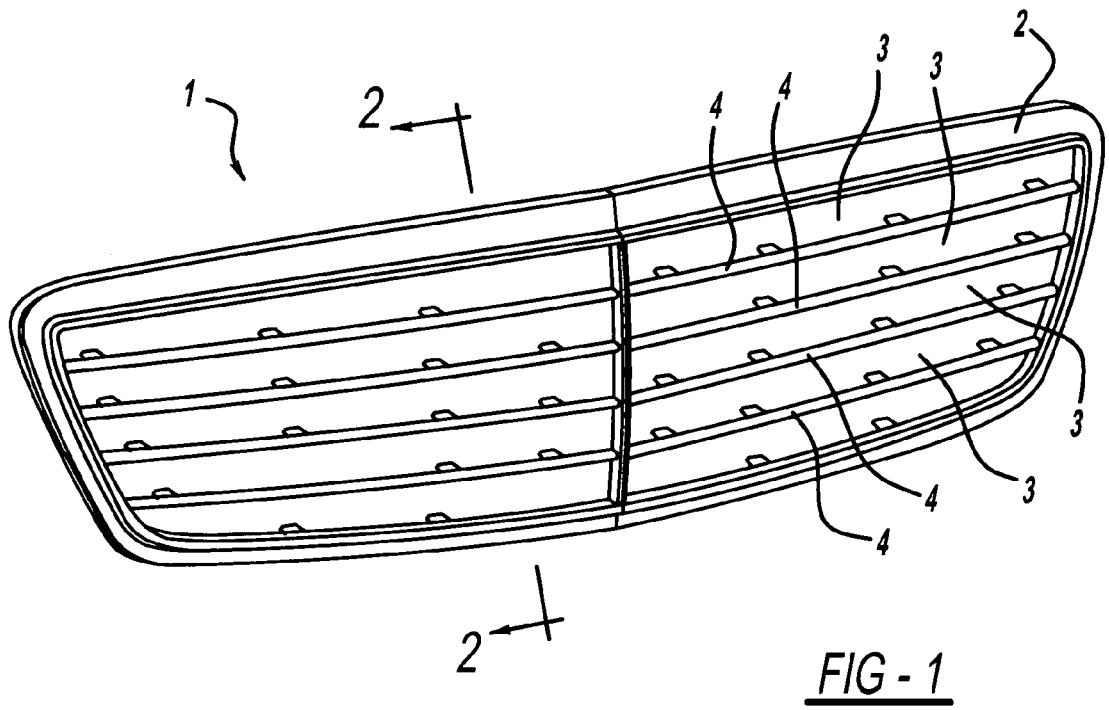
FIG. 1 shows a perspective view of a radiator grill of a radiator grill according to the invention viewed from the outside.

FIG. 1 shows a perspective front view of a radiator grill arrangement 1. The radiator grill arrangement 1 comprises a radiator grill 2 which is essentially formed as a fixed element and is installed in a fixed position in a motor vehicle. The radiator grill 2 has air flow openings 3 in the inflow direction of the radiator grill arrangement, these air flow openings 3 being formed between the strip elements 4 of the radiator grill arrangement 1. The radiator grill arrangement 1 further comprises a strip element assembly 5 (FIG. 2, not shown in FIG. 1) which is provided on an inner side of the radiator grill arrangement 1 adjacent to the radiator grill 2, i.e. behind the radiator grill 2 in the inflow direction. The strip element assembly 5 is hereinafter referred to as the grid for short, although this does not imply any restriction. The mode of operation of the grid is explained in more detail hereinafter.

Figure 2:
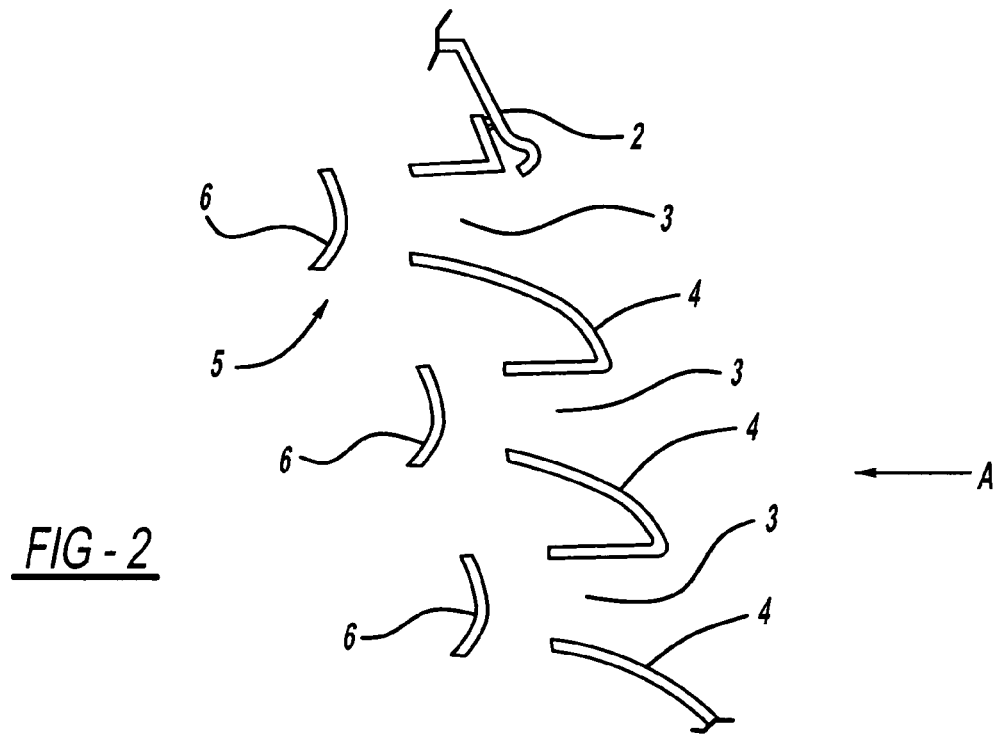
FIG. 2 shows the radiator grill according to the invention in lateral sectional view on the line I-I in FIG. 1, in the open state.

FIG. 2 shows the radiator grill arrangement 1 in lateral cross-sectional view on the line I-I in FIG. 1. Both the radiator grill 2 and the grid 5 are shown in highly simplified form in FIG. 2. It can be seen that the grid 5 is provided behind the radiator grill 2 in the direction of inflow A. The grid 5 comprises strip elements 6 the dimensions or configuration of which are adapted to the air flow openings 3 of the radiator grill 2. In a starting position of the radiator grill arrangement 1, the grid 5 is located in a position behind the radiator grill 2 in which the strip elements 6 are spaced from the respective air flow openings 3. Correspondingly, the radiator grill arrangement 1 is open, in the position shown in FIG. 2.

Figure 3:
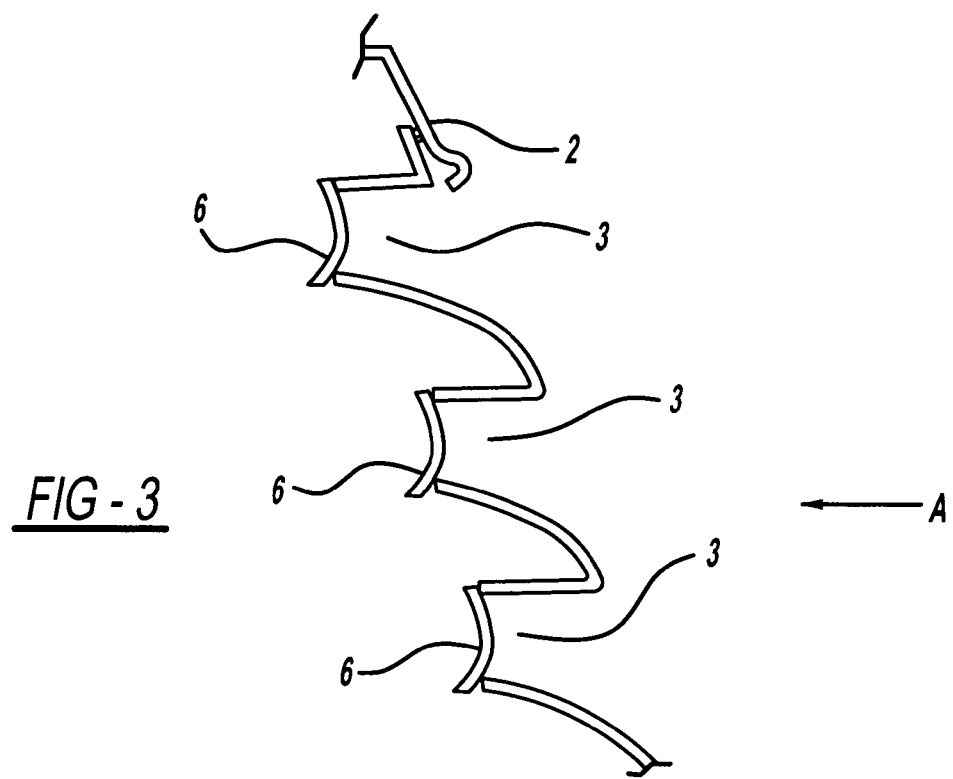
FIG. 3 shows the radiator grill arrangement of FIG. 2 in a closed state.

FIG. 3 shows the radiator grill arrangement 1 of FIG. 2 in a closed state. The grid 5 is connected to actuator devices or the like by means of which the grid 5 can be moved substantially parallel to the inflow direction A in the direction of the radiator grill 2. In the closed state of the radiator grill arrangement 1 the strip elements 6 press against the radiator grill 2 from behind so that the air flow openings 3 are closed off by the strip elements 6. An essential feature of the invention recites that the strip elements 6 are part of the grid 5. Thus in order to close the radiator grill arrangement all that is needed is to move a single component, namely the grid 5, in the direction of the radiator grill 2. This advantageously reduces the number of mounting devices, actuator devices for the grid 5 and the like which are needed.

The grid 5 may be attached behind the radiator grill 2 to a suitable actuator device which moves the grid 5 in translation relative to the radiator grill 2 and in the inflow direction A. The actuator device (not shown) may for example be a pneumatic cylinder device or the like. When pressure acts on the cylinder or cylinders the grid 5 attached to the pneumatic cylinder device is moved in the direction of the radiator grill 2, so that the strip elements 6 press against the radiator grill 2 from behind in order to close the air flow openings 3 as desired.

The actuator device for moving the grid 5 is expediently operated as a function of the travel status of the vehicle. When the vehicle is travelling at high speed the actuator device receives a corresponding control signal to move the grid 5 in the direction of the radiator grill 2 and thereby close the radiator grill arrangement 1. In the closed state of the radiator grill arrangement 1 the coefficient of air resistance ($c_w$ value) of the vehicle is advantageously lowered. Moreover, the operation of the actuator device may be designed so that the radiator grill arrangement 1 is closed in the stationary position of the vehicle as shown in FIG. 3. This effectively prevents an onlooker from looking through the radiator grill 2 arrangement 1 from direction A and recognising any motor drive components or the like. This ensures that the "nose" of the vehicle, i.e. the Front part of the vehicle, always gives the desired impression.

Figure 4:
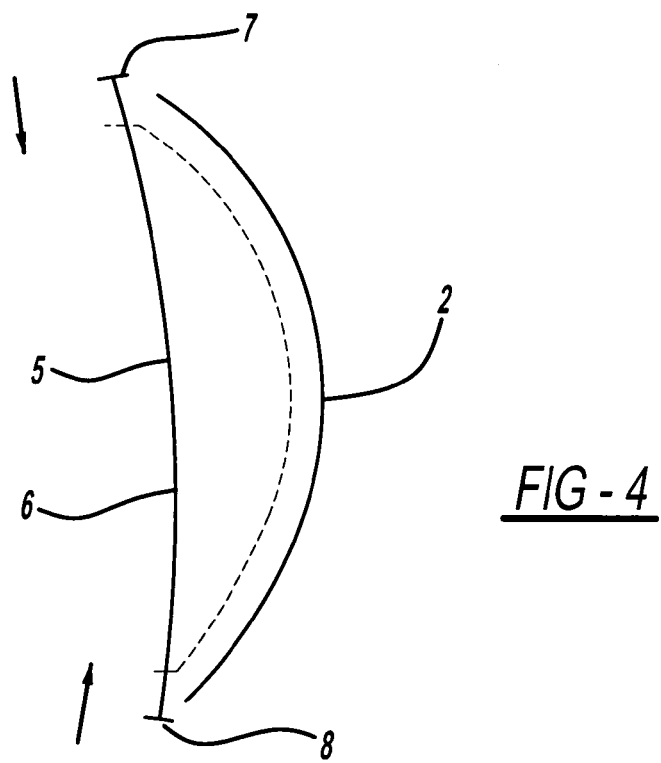
FIG. 4 shows a strip element assembly of the radiator grill arrangement in simplified side view.

FIG. 4 illustrates another possible method of adjusting the grid 5 in the direction of the radiator grill 2. The grid 5 is expediently made of plastics. The thickness and type of plastics are selected such that the grid 5 has elastic properties and can be deformed accordingly over its longitudinal dimension.

Apart from the elasticity in the longitudinal direction of the grid 5, i.e. generally across the width of the grid 5, it may also be elastically deformable in the direction of its height. This results in three-dimensional elastic deformability of the grid 5. This makes it possible to apply the grid 5 to any desired shape of radiator grill 2. The use of the grid 5 is thus not restricted to a specific radiator grill 2. Rather, the grid 5 can be used with a plurality of radiator grills 2 of different shapes.

FIG. 4 is a simplified side view of the grid 5 made of plastics. Attached to an upper edge region 7 and a lower edge region 8 are actuator devices (not shown) by means of which the edge regions can be moved down or up. As a result of this movement of the edge regions 7, 8 a central part of the grid 5 bulges outwardly in controlled manner in the direction of the radiator grill 2, so that the strip elements 6 bear on the air flow openings 3 of the radiator grill 2.

FIG. 4 shows the grid 5 in solid lines in its starting position. As indicated by arrows, the upper edge region 7 and the lower edge region 8 can be moved towards one another by the actuator devices. By operating the actuator devices the spacing of the edge regions from one another is shortened, thus causing the central part of the grid 5 to bulge in controlled manner towards the radiator grill 2. The bulging state of the grid 5 is shown by dotted lines.

Alternatively to the embodiment in FIG. 4 it is also possible to provide one of the two edge regions of the grid 5 fixedly in the radiator grill arrangement, while only the opposing edge region is connected to an actuator device and is thereby adjustable as desired. It will be understood that bulging or controlled deformation of the grid 5 as explained always takes place so as to adapt to the contour of the radiator grill 2. Irrespective of different methods of attachment of actuator devices to the grid 5, the elasticity of the grid as described above ensures that the grid 5 can be deformed with, for example, a straight movement of an actuator device in the direction of the radiator grill 2, so as to close off the air flow openings 3.

Figure 5:
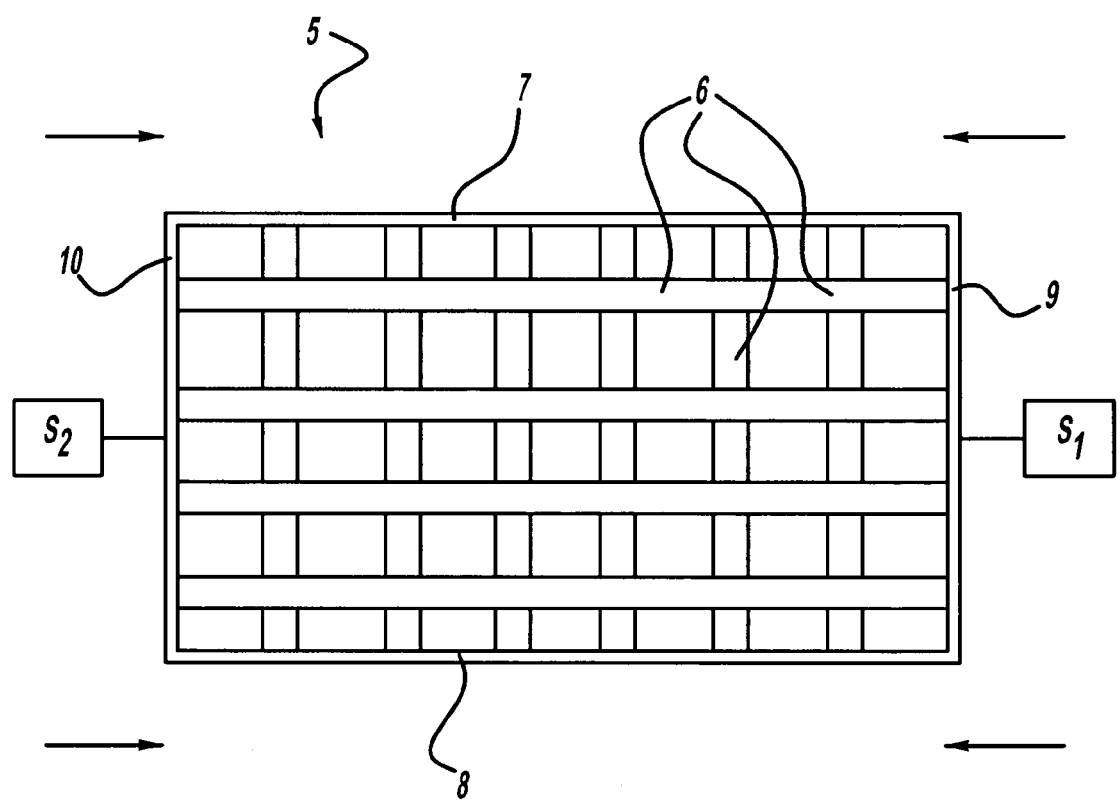
FIG. 5 shows the strip element assembly of the radiator grill arrangement in simplified plan view.

FIG. 5 shows a simplified plan view of the grid 5. As a departure from the embodiment in FIG. 4, actuator devices $S_1$ and $S_2$ are connected to a right-hand edge region 9 and left-hand edge region 10, respectively, of the grid 5. In order to close the radiator grill arrangement the actuator devices can be adjusted by corresponding control signals as indicated by arrows, thereby shortening the distance between the right-hand edge region 9 and the left-hand edge region 10. As a result, deliberate deformation of a central region of the grid 5 is produced in the direction of the radiator grill 2, which causes the radiator grill arrangement 1 to be closed, as already explained in connection with FIG. 4.

The radiator grill arrangement 1 according to the invention is advantageously characterised in that the air flow openings 3 of the radiator grill 2 can be closed by means of a single component, i.e. the one-piece grid 5. If the grid 5 is made of plastic and has elasticity for controlled deformation, the grid 5 can very easily be moved, for example, by linear movement of an actuator device.

The invention claimed is:

1. Closeable motor vehicle radiator grill arrangement, comprising:
   a radiator grill which has at least one air flow opening in the inflow direction and which is provided on an outer side of the radiator grill arrangement; and
   a one-piece strip element which is provided on an inner side of the radiator grill arrangement adjacent to and spaced from the radiator grill, the strip element assembly being movable relative to the radiator grill in order to close off the air flow opening and wherein the strip element assembly is elastically deformable over its width and/or height for causing the strip element to move in a direction substantially parallel to the inflow direction and substantially toward said radiator grill for closing off air flow through said at least one air flow opening.

2. Radiator grill arrangement according to claim 1, wherein the strip element assembly is movable transversely to the inflow direction.

3. Radiator grill arrangement according to claim 2, wherein the strip element assembly is movable translatory to the in-flow direction.

4. Radiator grill arrangement according to claim 1, wherein the strip element structure is movable in a direction parallel to the in-flow direction.

5. Radiator grill arrangement according to claim 1, wherein opposing edge regions of the strip element assembly are moved towards one another in order to close off the air flow opening.

6. Radiator grill arrangement according to claim 5, wherein an actuator device is mounted on at least one edge region of the strip element assembly, in order to adjust the distance of the edge region relative to the opposing edge region.

7. Radiator grill arrangement according to claim 1, wherein the radiator grill has a plurality of air flow openings, and the strip element assembly comprises a plurality of individual strips which are each adapted to the air flow openings in order to close off the air flow openings.

8. Radiator grill arrangement according to claim 7, wherein the strip assembly is made of a plastic.

9. Radiator grill arrangement according to claim 8, wherein the strip element structure is made from a composite structure consisting of plastic and metal.

10. Radiator grill arrangement according to claim 1, wherein the air flow opening through the strip element assembly is opened and closed as a function of a travel status of the motor vehicle.

11. Radiator grill arrangement according to claim 1, wherein the air flow opening is opened and closed off by the strip element structure as a function of a temperature of the engine of the vehicle.

* * * * *